United States Patent [19]
Bucknell et al.

[11] 4,084,620
[45] * Apr. 18, 1978

[54] DIAPHRAGM SPOUT ASSEMBLY

[76] Inventors: Ernest H. Bucknell, 1700 E. 58th Pl., Los Angeles, Calif. 90058; Jack K. Rauh, 2830 Kiska Ave., Hacienda Heights, Calif. 91745; Tony Radecki, 1943 Rodney Dr., Apt. 108, Los Angeles, Calif. 90027

[*] Notice: The portion of the term of this patent subsequent to Aug. 18, 1993, has been disclaimed.

[21] Appl. No.: 547,506

[22] Filed: Feb. 6, 1975

Related U.S. Application Data

[60] Continuation of Ser. No. 348,641, Apr. 6, 1973, abandoned, which is a division of Ser. No. 186,292, Oct. 4, 1971, Pat. No. 3,739,806.

[51] Int. Cl.² ............................................. F16L 5/00
[52] U.S. Cl. ..................... 137/801; 137/360; 285/302
[58] Field of Search ..................... 137/359, 360, 801; 285/32, 46, 298, 302

[56] References Cited

U.S. PATENT DOCUMENTS

| 176,796 | 5/1876 | Martin | 285/32 |
|---|---|---|---|
| 1,790,316 | 1/1931 | Mueller | 285/46 X |
| 1,933,839 | 11/1933 | Bloch | 137/801 X |
| 2,125,380 | 8/1938 | Krueger | 285/32 X |
| 2,997,058 | 8/1961 | Hall | 137/360 |
| 3,136,570 | 6/1964 | Lee | 137/360 X |
| 3,188,120 | 6/1965 | Peterson | 285/302 X |
| 3,190,308 | 6/1965 | Winkle et al. | 137/359 |
| 3,371,679 | 3/1968 | Minella | 137/359 X |
| 3,392,746 | 7/1968 | Young | 137/360 |
| 3,545,794 | 12/1970 | Wise | 285/423 X |

*Primary Examiner*—Gerald A. Michalsky
*Attorney, Agent, or Firm*—Spensley, Horn & Lubitz

[57] ABSTRACT

There is disclosed herein a spout assembly, such as a tub spout or the like for use in a fluid system employing a diverter valve and shower head or the like. Most of the parts of the assembly may be made of plastic, and the assembly includes a spout body having inlet and outlet chambers and a partition with an aperture therethrough separating the two chambers. A plunger is reciprocally mounted in the outlet chamber, and a portion thereof cooperates with a flexible diaphragm mounted in the aperture in the partition for terminating the flow of water through the spout assembly to thereby cause diverter valve operation, and flow through a shower head or the like in a conventional manner. A lift button is coupled with the plunger by a stem extending into the outlet chamber through a portion of the body. The plunger may include flow directing vanes for directing the flow of fluid from the outlet chamber in a desired manner. An adapter may be included within the inlet chamber of the body for enabling the spout assembly to be coupled with plumbing systems utilizing standard length outlet nipples, thus eliminating the necessity to custom make nipples on the job to fit varying wall thicknesses.

4 Claims, 5 Drawing Figures

DIAPHRAGM SPOUT ASSEMBLY

This is a continuation of application Ser. No. 348,641, filed Apr. 6, 1973, now abandoned, which itself is a division of application Ser. No. 186,292 filed Oct. 4, 1971, now U.S. Pat. No. 3,739,806.

SUMMARY OF THE INVENTION

This invention relates to water spout assemblies, and the like, and relates more particularly to an improved diaphragm diverter spout assembly.

Various types of diverter spout assemblies have been devised, examples being found in U.S. Pat. Nos. 3,086,748; 3,473,558; and 3,419,914. Many prior spout assemblies have been characterized by relatively complex and costly construction, unsuitable operation over a period of time in providing a proper sealing action during operation thereof, costly fabrication, difficulty of assembly or repair, or the like.

Accordingly, it is an object of this invention to provide an improved spout assembly.

Another object of this invention is to provide a new spout assembly wherein the principal parts thereof are composed of plastic.

A further object of this invention is to provide a new diverter spout assembly employing a novel combination of a flexible diaphragm and plunger or nozzle member for selectively terminating flow of fluid through the assembly.

Another object of this invention is to provide a spout assembly having adapter means for facilitating coupling with a plumbing system through walls of varying thicknesses.

These and other objects and features of the present invention will become better understood through a consideration of the following description taken in conjunction with the drawing in which.

DESCRIPTION OF THE PREFERRED EMBODIMENTS

Figure 1:
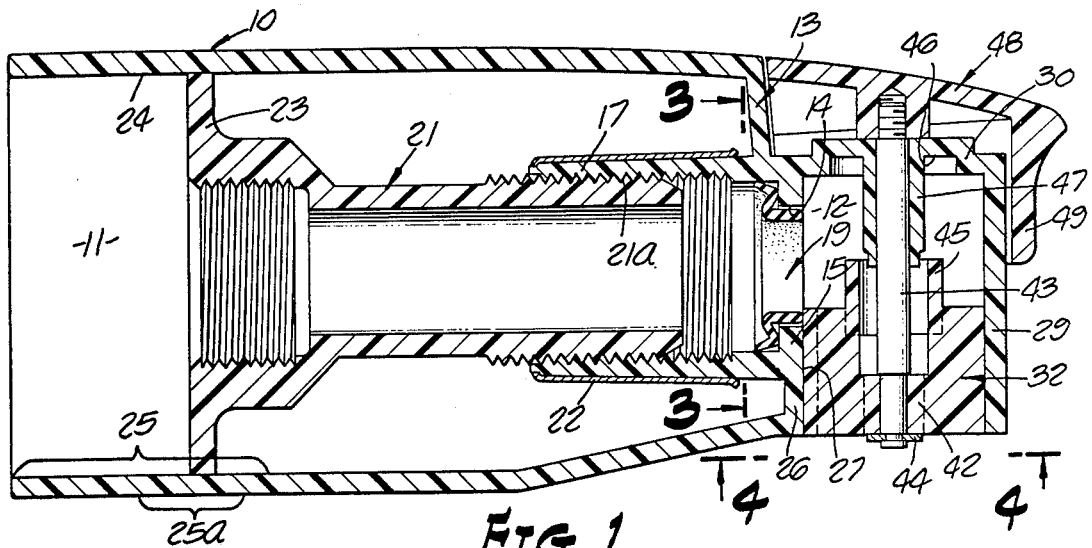
FIG. 1 is a cross sectional side elevational view of a spout assembly according to the present invention.

Turning now to the drawing, an exemplary spout assembly according to the present invention includes a body 10 molded of a suitable plastic material, such as that sold under the name Cycolac. The body includes an inlet chamber 11 and an outlet chamber 12 defined by a partition 13 separating these chambers. The partition 13 is in the form of a wall having a fluid flow aperture 14 therethrough. More specifically, the partition 13 includes a shoulder 15 having, preferably, a round aperture 14 therein. At the upstream side of the partition 13, there is formed an internally threaded cylindrical fitting 17 communicating with the aperture 14 for supplying fluid to the aperture. A flexible diaphragm 19, which will be explained in more detail subsequently, is located in the fitting 17 and is disposed at the central portion of the partition 13 and has a depending portion extending into the aperture 14 of the partition. An adapter 21, which may be formed of the same material as the body 10, has a first threaded end 21a which may be threaded into the fitting 17. A shell 22, which may be formed of metal such as stainless steel, is disposed about the exterior of the fitting 17 so as to enable a secure and liquid tight fit between the adapter 21 and fitting 17.

The other end of the adapter 21 may include a flange 23, the periphery of which abuts against the interior wall 24 of the spout body 10. Both the flange 23 and the interior portion 25 of the wall 24 may be circular for allowing the adapter 21 to be inserted and suitably secured into the fitting 17. The adapter 21 also is axially adjustable for a short range, such as up to one-half or 1 inch as indicated at 25a in FIG. 1. This arrangement enables the spout assembly to be coupled with plumbing systems by standard length nipples, without requiring nipples to be custom made to accomodate walls of different thicknesses.

The shoulder 15 of the partition 13, and a lower portion 26 of the partition 13, have a substantially flat downstream, or outer, face 27 which defines one wall of the outlet chamber 12. The remainder of the outlet chamber 12 is defined by an arcuate portion 29 and a top or cover portion 30.

A plunger 32 is disposed within the outlet chamber 12 and is mounted for reciprocal movement therein. This plunger includes a substantially flat rear face portion 33 and a plurality of webs 34–41 forming flow deflecting vanes constituting a nozzle. The webs 34 through 36 extend between the rear face portion 33 and a central portion 42 to which is secured the lower end of a stem 43 by means of a clip 44. Both the stem 43 and clip 44 may be formed of stainless steel, and the plunger 32 preferably is formed of the same material as the body 10. A collar 45 is integrally formed with the webs 34–41 and forms a stop in combination with an annular groove 46 in the cover 30 when the plunger 32 is raised to the psotition shown in FIG. 2.

Figure 2:
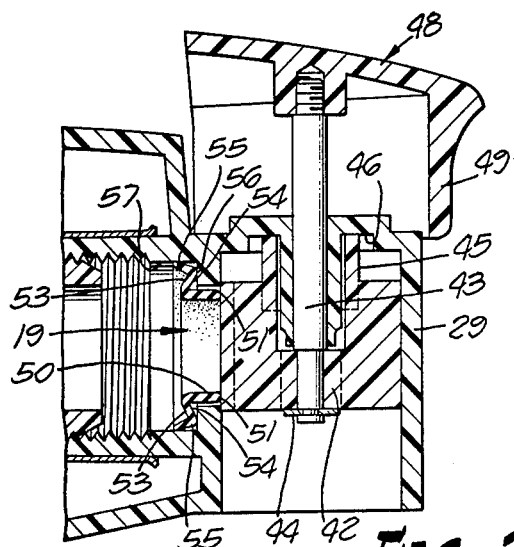
FIG. 2 is a partial cross sectional side elevational view illustrating a plunger or nozzle thereof in an off position to terminate flow through the assembly.
Figure 3:
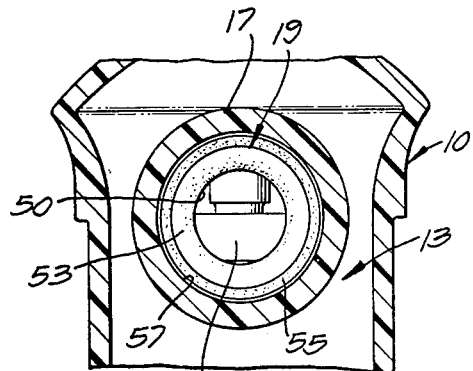
FIG. 3 is a cross sectional view taken along a line 3—3 of FIG. 1.

The stem 43 extends through a bushing portion 47 of the cover 30, and the upper end thereof is secured to a lift button 48 which likewise may be formed of the same material as the body 10. The lift button includes an arcuate skirt 49 overlapping the wall 29 of the body. As will be apparent to those skilled in the art, the lift button 48, which is external to the body 10, allows manual reciprocal movement of the plunger 32 within the outlet chamber 12. In the position illustrated in FIG. 1, fluid may flow from the adapter 21, through the diaphragm 19, and past the webs or vanes 34 through 41 to the exterior of the spout. When the lift button 48 is raised to the position shown in FIG. 2, the opening of the diaphragm 19 is sealed by the rear face portion 33 of the plunger 32, thereby terminating fluid flow to the outlet chamber 12. When the lift button 48 is raised as shown in FIG. 2, fluid pressure acting on the diaphragm 19 and face portion 33 of the plunger 32 causes both a seal between the downstream edge or face of the diaphragm 19 and the abutting face 33 of the plunger, and sufficient force on the plunger to prevent the same from falling back to the "on" position shown in FIG. 1.

Turning again to the flexible diaphragm 19, the same may be made of a suitable rubber material, such as 70 Shore E.P.R. The diaphragm includes a depending substantially cylindrical portion 50 terminating at the downstream end in an edge or face 51 which cooperates with the upstream face of the member 33 of the plunger 32. The other end of the diaphragm is of the nature of an integrally formed V-shaped flange 53 having an inwardly inclined annular leg 54 and terminating in an outwardly inclined annular leg 55. The outer apex of the legs 54 and 55 abuts the upstream surface 56 of the shoulder 15 of the partition 13, and the outer edge of the leg 55 abuts a cylindrical cavity 57 at the downstream end of the fitting 17 at the interface of the fitting 17 and shoulder 15. In this manner, the force of water on the diaphragm 19, and particularly on the upstream groove formed by the V-shaped portion 53, causes the outer apex to bear against the upstream face 56 of the shoulder 15, and the outer leg 55 to bear against the interior wall of the cavity 57, as well as causes the face 51 to bear against the upstream face of the member 33 of the plunger, to provide a good seal when the plunger is in its upper position as shown in FIG. 2. On the other hand, the diaphragm does not prevent the plunger 32 from falling to the position shown in FIG. 1 when water is turned off at the supply.

If desired, a coil spring may be coaxially mounted about the bushing 47 and collar 45, with the ends thereof abutting the underside of the cover 30 and top of the plunger 32, to bias the plunger to its lower position. Also, the plunger 32 may be secured by a stem in the form of a bolt, with the head of the bolt taking the place of the clip 44. In this case, a sleeve may be disposed about the bolt between the lift button 48 and the plunger 32 to rigidly secure together, and properly space, the plunger with respect to the lift button.

Figure 5:
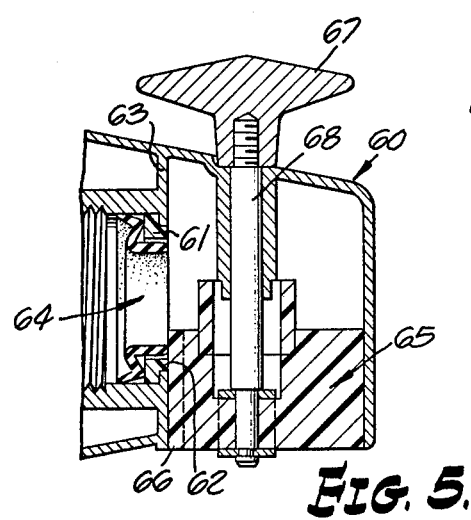
FIG. 5 is a partial cross sectional side elevational view illustrating a modification of the present spout assembly.
Figure 4:
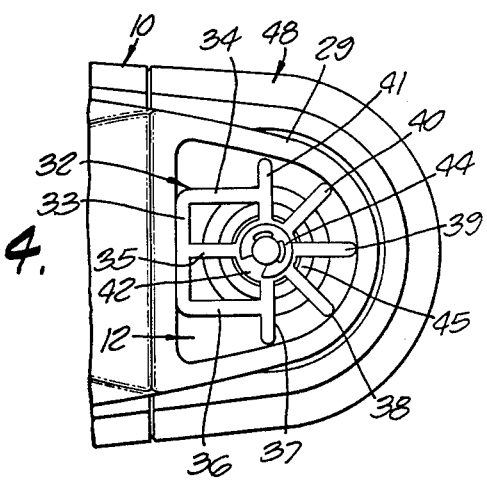
FIG. 4 is a partial bottom view taken along a line 4—4 of FIG. 1.

FIG. 5 illustrates a modification of the spout assembly, principally in the construction of the spout body 60 which may be formed either of metal or of plastic material. If formed of metal, preferably a plastic collar 61 is provided at an aperture 62 in a partition 63. The flexible diaphragm 64 is the same as the diaphragm 19, and the plunger 65 may be the same as the plunger 32 and have a similar rear face portion 66. A lift button 67 is coupled by means of a stem 68 with the plunger 65.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A spout assembly comprising:
   a body member having a fluid inlet chamber, a fluid outlet chamber and a partition wall extending inwardly of said body member, separating said inlet chamber from said outlet chamber, said partition wall having an aperture therein;
   connector means coupled with said partition for supplying fluid through said aperture in said partition;
   adapter means mounted within said inlet chamber for connecting said spout assembly to a plumbing system, said adapter means including an adapter member having a first end adjustably, threadably coupled with said connector means in a relatively fluid-tight relationship, and having a second end adapted to be coupled with a plumbing system, said adapter member being supported within said inlet chamber of said body member and being axially adjustable for enabling the spout assembly to be coupled with a plumbing system through walls of different thicknesses by standard length nipple means, and
   said second end of said adapter member including a flange extending outwardly from said adapter member and engaging the inner wall of the fluid inlet chamber of said body member, said flange being slidable along said inner wall upon said adapter member being rotated with respect to said connector means.

2. A spout assembly comprising:
   a body member having a fluid inlet chamber, a fluid outlet chamber and a partition wall integrally formed with said body member and extending inwardly thereof, separating said inlet chamber from said outlet chamber, said partition wall having an aperture therein;
   connector means integrally formed with said partition for supplying fluid through said aperture in said partition; and
   adaptor means mounted within said inlet chamber for connecting said spout assembly to a plumbing system, said adaptor means including an adapter member having a first end adjustably coupled with said connector means in a relatively fluid-tight relationship, and having a second end adapted to be coupled with a plumbing system, said adapter member having laterally extending means engaging the inner wall of said inlet chamber of said body member for supporting said adapter member therein, and said adapter member being axially adjustable for enabling the spout assembly to be coupled with a plumbing system through walls of different thicknesses by nipple means.

3. A spout assembly as in claim 2 wherein said first end of said adapter member is threadably coupled with said connector means, and
   said second end of said adapter member includes a flange extending outwardly from said adapter member and engaging the inner wall of the fluid inlet chamber of said body member, said flange being slidable along said inner wall upon said adapter member being rotated with respect to said connector means.

4. A spout assembly as in claim 3 wherein said connector means has an opening therethrough communicating with said aperture in said partition and including a fitting with which said first end of said member is adjustably coupled, and
   said connector means includes sleeve means on the periphery of said fitting.

* * * * *